(12) United States Patent
Erbes

(10) Patent No.: US 7,649,970 B2
(45) Date of Patent: Jan. 19, 2010

(54) REPAIR APPARATUS FOR A NUCLEAR REACTOR SHROUD

(75) Inventor: John Geddes Erbes, Mountain View, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/196,752

(22) Filed: Aug. 4, 2005

(65) Prior Publication Data

US 2007/0030942 A1    Feb. 8, 2007

(51) Int. Cl.
*G21C 9/00* (2006.01)

(52) U.S. Cl. .................. 376/302; 376/285; 376/287; 29/280

(58) Field of Classification Search ............... 376/302, 376/278, 260, 294, 285, 287; 29/890.031, 29/890
See application file for complete search history.

(56) References Cited

U.S. PATENT DOCUMENTS

| | | | | |
|---|---|---|---|---|
| 3,275,181 A | * | 9/1966 | Leclou | 220/565 |
| 3,588,074 A | * | 6/1971 | Ochs | 267/33 |
| 3,744,660 A | * | 7/1973 | Gaines et al. | 220/582 |
| 4,297,061 A | * | 10/1981 | Wolfe et al. | 409/131 |
| 4,592,186 A | * | 6/1986 | Braginetz | 52/699 |
| 4,818,470 A | * | 4/1989 | Richardson et al. | 376/245 |
| 5,392,322 A | * | 2/1995 | Whitling et al. | 376/260 |
| 5,402,570 A | * | 4/1995 | Weems et al. | 29/890.031 |
| 5,502,754 A | * | 3/1996 | Erbes | 376/302 |
| 5,521,951 A | | 5/1996 | Charnley et al. | |
| 5,538,381 A | * | 7/1996 | Erbes | 411/509 |
| 5,600,689 A | * | 2/1997 | Weems et al. | 376/302 |
| 5,600,690 A | * | 2/1997 | Weems et al. | 376/302 |
| 5,615,239 A | * | 3/1997 | Deaver et al. | 376/247 |
| 5,621,778 A | * | 4/1997 | Erbes | 376/302 |
| 5,623,526 A | * | 4/1997 | Wivagg | 376/288 |
| 5,654,992 A | * | 8/1997 | Uraki et al. | 376/260 |
| 5,675,619 A | | 10/1997 | Erbes et al. | |
| 5,742,653 A | | 4/1998 | Erbes et al. | |
| 5,802,129 A | * | 9/1998 | Deaver et al. | 376/287 |
| 6,021,170 A | * | 2/2000 | Reimer et al. | 376/261 |
| 6,053,652 A | * | 4/2000 | Deaver et al. | 403/24 |
| 6,067,338 A | | 5/2000 | Erbes | |
| 6,343,107 B1 | | 1/2002 | Erbes et al. | |

FOREIGN PATENT DOCUMENTS

| | | |
|---|---|---|
| ES | 2080033 T1 | 2/1996 |
| ES | 2116885 A1 | 7/1998 |
| ES | 2121665 A1 | 12/1998 |

OTHER PUBLICATIONS

Spanish Search Report No. 200602026 on Apr. 16, 2008.

* cited by examiner

*Primary Examiner*—Rick Palabrica
(74) *Attorney, Agent, or Firm*—Nixon & Vanderhye, P.C.

(57) ABSTRACT

The tie rod repair apparatus includes a tie rod secured at its upper end to the shroud flange at the top of the shroud. The lower end of the tie rod passes through an opening in the shroud support plate without imposing a load on the plate. The lower end of the tie rod is anchored to the lower end of the core shroud support cylinder such that the compressive load path exerted by the tie rod to restrain the cracked shroud passes directly through the shroud support cylinder and the assembly of shroud cylinders bypassing the shroud support plate.

2 Claims, 2 Drawing Sheets

REPAIR APPARATUS FOR A NUCLEAR REACTOR SHROUD

The present invention relates to repair apparatus for the core shroud of a boiling water nuclear reactor and particularly relates to a tie rod repair which locates the compressive load path exerted by the tie rods to restrain a cracked shroud directly through the shroud support cylinder and shroud cylinders without applying additional load to the shroud support plate.

BACKGROUND OF THE INVENTION

The core shroud in boiling water reactors (BWR) supports and locates the reactor core within the reactor pressure vessel (RPV), and forms the flow partition for the reactor core coolant. It is constructed of a number of stainless steel circular rings and cylindrical rolled plate sections, joined at their ends with circumferential welds. The welding introduces residual stresses in the weld heat affected zones. It additionally locally sensitizes the stainless steel, which depletes the grain structure of chromium and reduces corrosion resistance. These factors, combined with the BWR reactor coolant environment, make the weld heat affected zones susceptible to intergranular stress corrosion cracking (IGSCC), observed in many BWR shrouds. The cracking impairs the structural integrity of the shroud. Particularly, lateral seismic loading or loss of coolant accident (LOCA) conditions could cause relative displacements at cracked weld locations which could produce large core flow leakage and misalignment of the core that could prevent control rod insertion and safe shutdown.

IGSCC cracking in BWR core shrouds has typically been addressed by installation of a tie rod design shroud repair. The repair assembly integrates the required vertical and lateral restraint features to replace the structural function of all the shroud circumferential weld joints, assuming their failure. This repair uses tensioned tie rods to compressively load the respective circumferential weld joints, preventing their separation. Horizontal stabilizers are attached to the tie rod assemblies which maintain the lateral alignment of the top and bottom of the core at the top guide and core plate, respectively. Additionally, limit stops are located to restrain the shroud cylinder sections below the top guide and core plate support rings. The required anchorage at the bottom of the shroud is obtained by machining a hole through the shroud support, which allows an attachment such as a clevis and toggle bar, reacting against the bottom of the shroud support plate. Another anchorage secures the lower end of the tie rod to a gusset plate, in turn, secured to the shroud support plate. These anchorage arrangements are not feasible where the structural integrity of the shroud support plate has also been impaired by IGSCC cracking, such that it cannot support the additional localized loading for the required tie rod anchorage at the bottom of the shroud.

BRIEF DESCRIPTION OF THE INVENTION

In a preferred embodiment of the present invention, there is provided a repair apparatus for repairing the horizontal welds of a shroud in a nuclear reactor pressure vessel including a core shroud defining an annulus with the reactor pressure vessel, a core shroud support plate and a shroud support cylinder underlying the core shroud, the repair apparatus comprising; an upper support assembly for securement to the core shroud; a tie rod secured at an upper end thereof to the upper support assembly and extending in the annulus; a lower stabilizer assembly with a wedge bearing against the vessel shell enabling alignment of the tie rod to pass closely adjacent to the lower shroud cylinder; a lower end of the tie rod extending through an opening in the core shroud support plate; and an anchor attached to the lower end of the tie rod and the lower shroud support cylinder enabling a compressive load path through the shroud support cylinder and core shroud substantially without loading the shroud support plate.

In another preferred embodiment of the present invention, there is provided a repair apparatus for repairing a shroud in a nuclear reactor pressure vessel including a core shroud defining an annulus with the reactor pressure vessel, a core shroud support cylinder and plate, shroud cylinders defining the core shroud, the repair apparatus comprising; an upper support assembly for securement to the shroud; a tie rod secured at an upper end thereof to the upper support assembly and extending in the annulus; a lower stabilizer assembly attached to each tie rod with a wedge bearing against the vessel shell enabling alignment of the tie rod to pass closely adjacent to the lower shroud cylinder; a lower end of the tie rod extending through an opening in the core shroud support plate; and an anchor attached to the lower end of the tie rod and the core shroud support cylinder enabling a compressive load path through the shroud cylinders substantially without loading the shroud support plate.

In a further embodiment of the present invention, there is provided a repair apparatus for repairing a shroud in a nuclear reactor pressure vessel including a core shroud defining an annulus with the reactor pressure vessel, a core shroud support cylinder and plate, and stacked shroud cylinders defining the core shroud, the repair apparatus comprising; a plurality of upper support assemblies substantially uniformly spaced circumferentially one from the other for securement to the shroud; a plurality of tie rods secured at upper ends thereof to the upper support assemblies, respectively, and extending in the annulus; a plurality of lower stabilizer assemblies attached to said tie rods, respectively, with wedges bearing against the vessel shell enabling alignment of the tie rods to pass closely adjacent to the lower shroud cylinder; lower ends of the tie rod extending through respective openings in the core shroud support plate; and an anchor attached to each lower end of each tie rod and the core shroud support cylinder enabling a compressive load path through the shroud cylinders substantially without loading the shroud support plate.

DETAILED DESCRIPTION OF THE INVENTION

Figure 1:
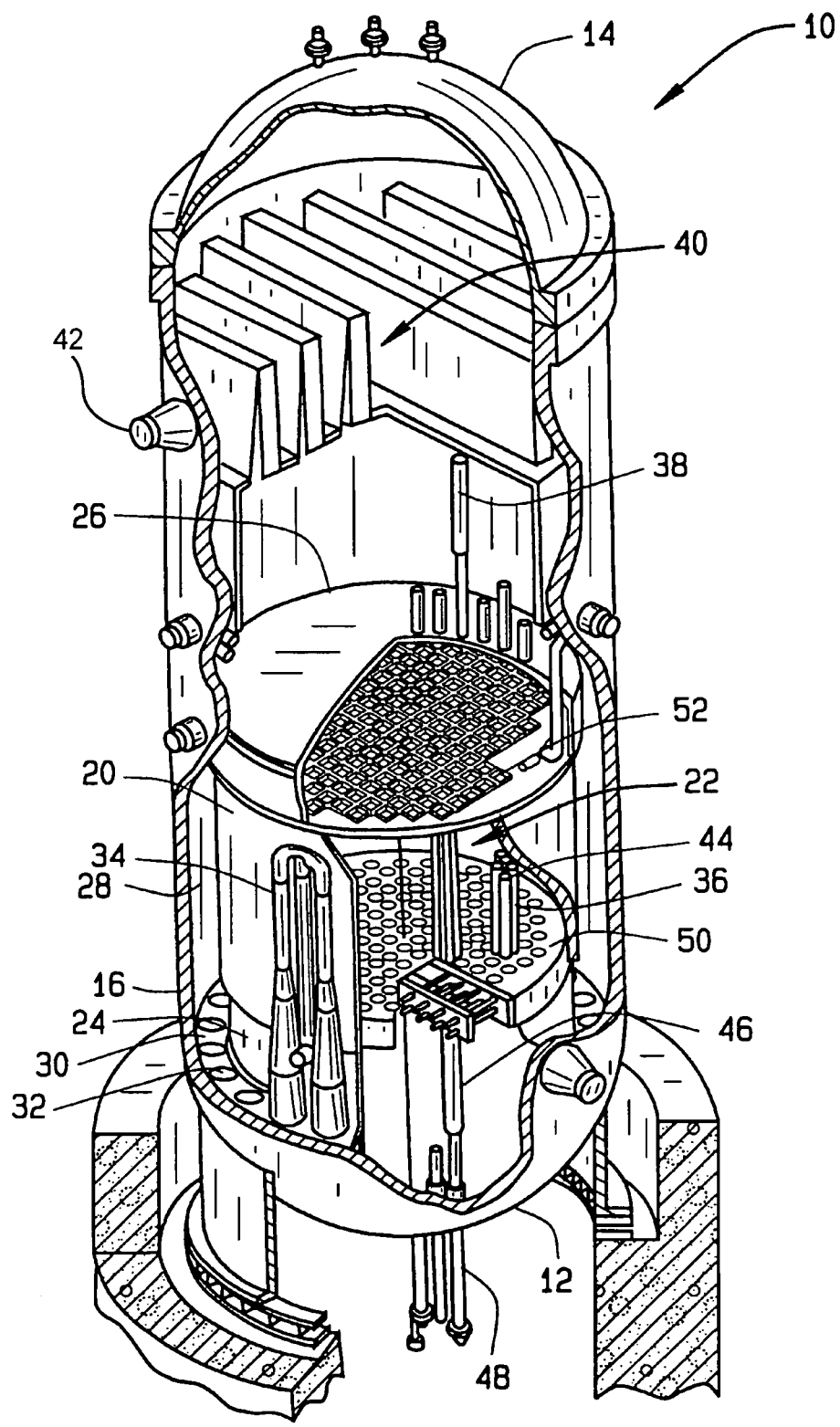
FIG. 1 is a schematic illustration with portions cut away of a conventional boiling water nuclear reactor illustrating the location of the core shroud and core shroud support plate.
Figures 2, 3:
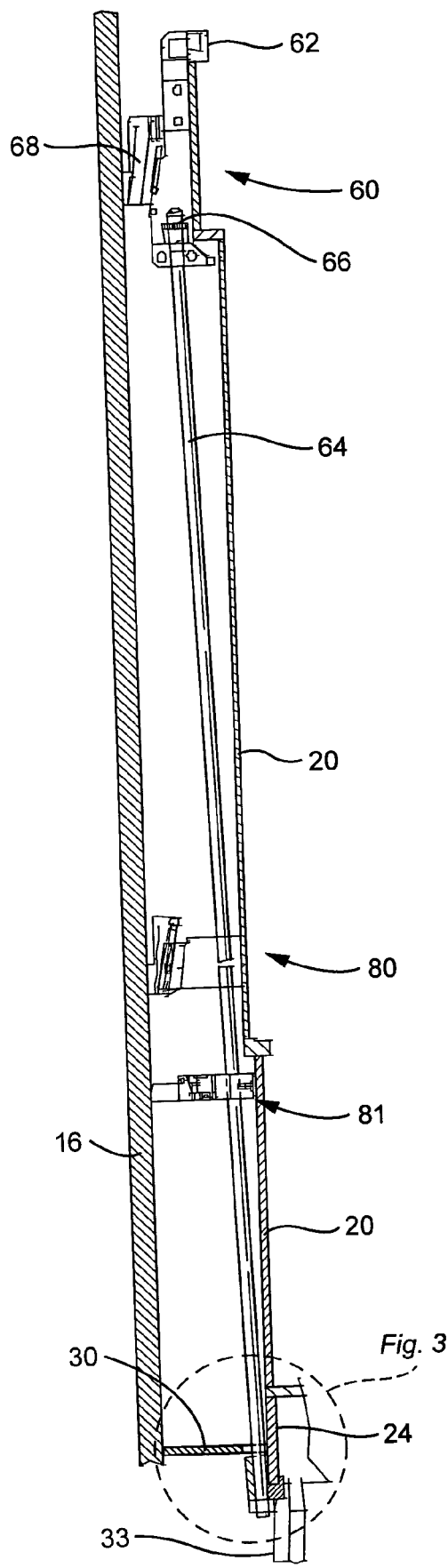
FIG. 2 is an enlarged fragmentary elevational view of repair apparatus for the core shroud illustrated in FIG. 2.
FIG. 3 an enlarged view indicated by the dash lines in FIG. 2 of the lower end of a tie rod forming part of the repair apparatus hereof.

FIG. 1 is a sectional view, with parts cut away in cross section, of a boiling water nuclear reactor pressure vessel (RPV) 10. RPV 10 has a generally cylindrical shape and is closed at one end by a bottom head 12 and at its upper end by a removable top head 14. An RPV shell 16 extends from bottom head 12 to top head 14. A cylindrically shaped core shroud 20 surrounds a reactor core 22. Shroud 20 is supported at one end by a lower shroud support cylinder 24 and includes a removable shroud head 26 at its upper end. An annulus 28 is formed between shroud 20 and RPV shell 16. Shroud support plate 30, which has a flat ring shape, extends between shroud support cylinder 24 and RPV shell 16. The shroud support cylinder 24 is also attached to the RPV bottom head 12 by a plurality of vertical stilts 33 located at substantially equally spaced positions about the shroud support cylinder 24, shown on FIG. 2. Loads required to support core shroud 20 and reactor core 22 are transmitted by shroud support cylinder 24 into RPV shell 16 and bottom heard 12 by plate 30 and stilts 33, respectively. Plate 30 includes a plurality of circular openings 32, with a jet pump assembly 34 attached to each opening. Jet pump assemblies 34 are circumferentially distributed around core shroud 20.

Heat is generated within core 22, which includes fuel bundles 36 of fissionable material. Water circulated up through core 22 is at least partially converted to steam. Steam separators 38 separate steam from water, which is recirculated. Residual water is removed from the steam by steam dryers 40. The steam exits RPV 10 through a steam outlet 42 near vessel top head 14.

The amount of heat generated in core 22 is regulated by inserting and withdrawing control rods 44 of neutron absorbing material, such as for example, hafnium. To the extent that control rods 44 are inserted into fuel bundle 36, they absorb neutrons that would otherwise be available to promote the chain reaction which generates heat in core 22. Control rod guide tubes 46 maintain the vertical motion of control rods 44 during insertion and withdrawal. Control rod drives 48 effect the insertion and withdrawal of control rods 44. Control rod drives 48 extend through bottom head 12.

Fuel bundles 36 are aligned by a core plate 50 located at the base of core 22. A top guide 52 aligns fuel bundles 36 as they are lowered into core 22. Core plate 50 and top guide 52 are supported by core shroud 20.

Referring now to the tie rod repair apparatus in accordance with a preferred embodiment of the present invention, the apparatus includes features such as upper supports generally designated 60 (FIG. 2) utilized in prior shroud repair. For example, each upper support 60 may be similar to the upper support and stabilizer assemblies disclosed in U.S. Pat. Nos. 6,343,107 and 5,742,653 of common assignee herewith.

In this embodiment, the upper support 60 uses a hook attachment to the shroud flange 62 at the top of the shroud, as before. Notches may be machined in the shroud flange 62 at the tie rod locations or alternatively in the shroud head outer cylinder. In either case, spaces provided by the notches allow seating of the hook against the top of the shroud flange. The upper end of a tie rod 64 is connected to the upper support 60 by a threaded tie rod nut 66. The upper support 60 also includes a wedge assembly 68 which bears against the vessel wall at the elevation of the top guide. The wedge engages mating surfaces on the upper support typically inclined at about 10° such that vertical travel produces a horizontal preload against the vessel shell. The wedge is attached to the upper support by a jack bolt which is threaded through a block mounted on the upper support to adjust preloading of the wedge between the upper support and the vessel shell. The wedge 68 also includes an integral compliant leaf spring member formed by a slot in the wedge. The wedge preload secures the assembly against looseness and vibratory wear during operation while the leaf spring flexibility accommodates operating variations in annulus width to limit horizontal and friction interaction loads. The wedge slot is sized to accommodate these variations but closes to form a solid load path when reacting horizontal seismic loading. Assembly of the upper wedges to the supports together forms the upper stabilizers. The foregoing upper support and stabilizer assembly is substantially described and illustrated in the aforementioned patents.

A lower stabilizer assembly generally designated 80 is attached to the tie rod and includes a slotted wedge which functions in the same manner as the upper wedge. This arrangement accomplishes the same alignment and lateral support of the core at the elevation of the core plate, as described in the aforementioned patents. However, in this embodiment, the lower wedge assembly bears against the vessel wall instead of the shroud, which enables the required alignment of tie rod 64 such that its lower end can pass closely adjacent to the lower shroud support cylinder 24. A lower limit stop assembly generally designated 81 is attached to the tie rod, located to restrain the lower shroud cylinder 20 below the core plate support ring, as described in the aforementioned patents.

In the present invention, the tie rod 64, of which there are four or more, are located at substantially equally spaced positions about the shroud annulus. Each tie rod 64 is aligned such that its lower end is located closely adjacent to the lower shroud support cylinder 24 radially inwardly of the jet pump sensing lines. To secure the lower end of each tie rod 64 in a manner such that the load path does not load or does not substantially load the shroud support plate 30, a hole 70 is provided, e.g., machined through the shroud support plate 30 during installation to accommodate the lower end of tie rod 64. Hole 70 is machined to provide a close fit to lower tie rod 64 to limit core flow bypass leakage. Each tie rod 64 thus passes through the shroud support plate, preferably without imposing a load on the shroud support plate 30, and terminates in an anchor member 90 having a hook 92. Hook 92 bears against the bottom of the shroud support cylinder 24 at an accessible location between adjacent stilts 33. The lower end of each tie rod 64 is secured to the anchor 90 by a threaded nut 94. The anchor member 90 is installed by lowering it through the core plate opening 70 followed by threading nut 94 on the end of the tie rod. It will be appreciated that the compressive load path exerted by the tie rods 64 to restrain the cracked shroud passes directly through the shroud support cylinder 24 and the stacked and welded shroud cylinders above the shroud support cylinder 24 bypassing the shroud support plate 30. That is, additional loads are not imposed upon the shroud support plate 30 by the tie rod core shroud repair.

Upon initial installation, a low pre-load is applied by torquing the nut 66 to secure the assembly against looseness and vibratory wear during transition to operating conditions. The assembly acquires the required operating preload by thermal tightening when the reactor heats up to operating condition. This is achieved because the thermal expansion coefficient of the stainless steel shroud is greater than the thermal coefficient of the materials used in the tie rod assembly, typically Inconel Alloy X-750 and XM-19 stainless steel.

From the foregoing, it will be appreciated that the tie rod repair integrates the required vertical and lateral restraint features which replace the structural function of all of the circumferential weld joints of the shroud cylinders, assuming their failure from stress corrosion cracking. The tie rod repair additionally performs this function notwithstanding that the structural integrity of the shroud support plate may be similarly compromised to the extent that it cannot support the additional localized loading for the required tie rod anchorage at the shroud support plate. Thus, by passing the tie rod through the shroud support plate without imposing additional loading and anchoring the tie rod to the bottom of the shroud support cylinder, the compressive load path exerted by the tie rods to restrain the cracked shroud, passes directly through the shroud support cylinder and superposed shroud cylinders bypassing the shroud support plate. This arrangement also accomplishes the same alignment and lateral support of the core as described in the aforementioned patents.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A nuclear reactor pressure vessel and a repair apparatus for repairing horizontal cracks in a core shroud in the nuclear reactor pressure vessel, the core shroud defining an annulus with said reactor pressure vessel and surrounding a reactor core that also includes a core shroud support cylinder underlying the core shroud and a horizontal core shroud support plate extending radially outwardly of said core shroud support cylinder, wherein plural stacked and welded shroud cylinders define the core shroud, the repair apparatus comprising;

a plurality of upper support assemblies substantially uniformly spaced circumferentially one from the other for securement to an upper end of said core shroud;

a plurality of tie rods secured at upper ends thereof to said upper support assemblies, respectively, and extending axially in an annulus between a shell of the pressure vessel and said core shroud;

a plurality of lower stabilizer assemblies attached to said tie rods, respectively, with wedges bearing against the vessel shell enabling alignment of the tie rods to pass closely adjacent to said core shroud support cylinder;

lower ends of said tie rods extending through respective openings in the core shroud support plate; and an anchor attached to each said lower end of each tie rod and attached directly to a lower edge of said core shroud support cylinder at a location below and spaced from said core shroud support plate, wherein the lower end of each said tie rod is threaded and extends through said anchor, and wherein a nut is threaded to said lower end of each tie rod to secure said anchor and said tie rod to one another thereby enabling the tie rods to apply a compressive load to said plural shroud cylinders via said upper support assemblies and said core shroud support cylinder sufficient to repair horizontal cracks at welded joints between said plural shroud cylinders.

2. The nuclear reactor pressure vessel and repair apparatus according to claim 1, wherein each said anchor includes a hook member.

* * * * *